United States Patent
Burrell et al.

(10) Patent No.: US 9,765,873 B2
(45) Date of Patent: Sep. 19, 2017

(54) GEAR CONTROL SYSTEM FOR VIBRATION ATTENUATION

(71) Applicant: Parker-Hannifin Corporation, Cleveland, OH (US)

(72) Inventors: John W. Burrell, Olive Branch, MS (US); John Loeffler, Sun City Center, FL (US); Brian L. Rang, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/438,028

(22) PCT Filed: Oct. 31, 2013

(86) PCT No.: PCT/US2013/067736
§ 371 (c)(1),
(2) Date: Apr. 23, 2015

(87) PCT Pub. No.: WO2014/071004
PCT Pub. Date: May 8, 2014

(65) Prior Publication Data
US 2015/0276040 A1   Oct. 1, 2015

Related U.S. Application Data

(60) Provisional application No. 61/720,762, filed on Oct. 31, 2012.

(51) Int. Cl.
*F16H 57/022* (2012.01)
*F16H 57/12* (2006.01)
*F16H 57/00* (2012.01)

(52) U.S. Cl.
CPC ....... *F16H 57/022* (2013.01); *F16H 57/0006* (2013.01); *F16H 57/12* (2013.01);
(Continued)

(58) Field of Classification Search
CPC .... F16H 57/022; F16H 57/12; F16H 57/0006; F16H 57/125; F16H 57/126;
(Continued)

(56) References Cited

U.S. PATENT DOCUMENTS 1,359,848 A * 11/1920 Techel ............... F16F 15/161
                                                      244/99.13
2,010,718 A *  8/1935 Hartsock ............ F16D 23/04
                                                      192/47

(Continued)

FOREIGN PATENT DOCUMENTS

DE      102009027509 A1    1/2011
GB         2454347 A       5/2009

OTHER PUBLICATIONS

PCT International Search Report, Application No. PCT/US2013/067736, dated Feb. 12, 2014.
(Continued)

*Primary Examiner* — Paul N Dickson
*Assistant Examiner* — Timothy Wilhelm
(74) *Attorney, Agent, or Firm* — MacMillan, Sobanski & Todd, LLC

(57) ABSTRACT

A power take off unit includes an input gear, an output gear, and an intermediary gear that cooperate to transfer power from a rotational power source to an operating target. The power take off unit has a control module that biases the intermediary gear relative to the input gear and the output gear to reduce gear rattle vibrations associated with intermeshed tooth looseness.

14 Claims, 9 Drawing Sheets

(52) U.S. Cl.
CPC ............... *F16H 2057/0222* (2013.01); *F16H 2057/127* (2013.01); *Y10T 74/19575* (2015.01)

(58) Field of Classification Search
CPC ............... F16H 57/2057; F16H 57/127; F16H 2057/0222; Y10T 74/19575
See application file for complete search history.

(56) References Cited

U.S. PATENT DOCUMENTS

| | | | | |
|---|---|---|---|---|
| 2,265,628 A * | 12/1941 | Chase | ................... | G06M 1/041 235/136 |
| 2,397,777 A * | 4/1946 | Colman | ................... | F16H 3/001 74/399 |
| 2,696,124 A * | 12/1954 | Flowers | ................... | F16D 3/06 403/355 |
| 2,703,497 A * | 3/1955 | Townsend | ............. | F16H 57/022 74/399 |
| 2,895,342 A * | 7/1959 | Hayhurst | ................... | F16H 1/22 74/409 |
| 2,909,047 A * | 10/1959 | Walterscheld-Muller | ................... | F16D 7/048 192/56.1 |
| 2,918,826 A | 12/1959 | Miller | | |
| 2,992,712 A * | 7/1961 | McGill | ................... | F16H 39/32 60/435 |
| 3,331,256 A * | 7/1967 | Morris | ................... | F16H 35/008 123/90.15 |
| 3,889,549 A * | 6/1975 | Fieuzal | ................... | F16H 1/22 74/409 |
| 4,055,092 A * | 10/1977 | Aberg | ................... | F16H 55/18 74/425 |
| 4,072,064 A * | 2/1978 | Lloyd | ................... | F16H 55/18 74/409 |
| 4,442,728 A * | 4/1984 | Jahnel | ................... | F16C 25/00 192/48.7 |
| 4,671,223 A * | 6/1987 | Asano | ................... | F01L 1/02 123/197.1 |
| 4,739,670 A * | 4/1988 | Tomita | ................... | F16H 55/18 74/409 |
| 4,770,054 A * | 9/1988 | Ha | ................... | F16D 41/066 192/223.2 |
| 4,873,882 A * | 10/1989 | Goscenski, Jr. | .......... | F16D 1/06 464/160 |
| 4,987,987 A * | 1/1991 | Damon | ................... | F16D 13/68 192/201 |
| 5,042,315 A * | 8/1991 | Fahy | ................... | F16H 57/12 74/411 |
| 5,170,676 A * | 12/1992 | Matouka | ............... | B60T 8/4266 464/30 |
| 5,542,311 A | 8/1996 | Deeg | | |
| 5,557,980 A * | 9/1996 | Mastroianni | .......... | B60K 17/28 192/54.3 |
| 5,685,197 A | 11/1997 | Baker et al. | | |
| 5,813,335 A * | 9/1998 | Burke | ................... | B41F 13/012 101/177 |
| 5,870,928 A * | 2/1999 | Genter | ................... | F16H 55/18 74/409 |
| 5,979,259 A * | 11/1999 | Shook | ................... | F16H 55/18 123/90.31 |
| 5,979,260 A * | 11/1999 | Long | ................... | F16H 55/18 464/62.1 |
| 6,021,686 A * | 2/2000 | Mizoguchi | ............. | F02B 61/02 74/409 |
| 6,109,129 A * | 8/2000 | Genter | ................... | F16H 55/18 74/397 |
| 6,626,139 B1 * | 9/2003 | Horita | ................... | F16F 15/12 123/192.2 |
| 6,638,197 B2 * | 10/2003 | Ogawa | ................... | B60W 10/02 477/174 |
| 6,860,829 B2 * | 3/2005 | Bock | ................... | B62D 5/0409 180/443 |
| 6,997,076 B2 * | 2/2006 | Menjak | ................... | B62D 1/105 74/409 |
| 7,086,302 B2 * | 8/2006 | Ask | ................... | F16H 55/18 40/440 |
| 7,658,124 B2 * | 2/2010 | Brosowske | ............... | F01L 1/02 74/409 |
| 7,748,288 B2 * | 7/2010 | Chevalier | ............... | F16H 57/12 74/406 |
| 8,225,689 B2 * | 7/2012 | Brosowske | ............... | F01L 1/02 74/397 |
| 8,567,553 B2 * | 10/2013 | Hamakita | ............. | B62D 5/0409 180/443 |
| 8,646,351 B2 * | 2/2014 | Fuechsel | ............... | B62D 5/0409 74/388 PS |
| 8,657,691 B2 * | 2/2014 | Watarai | ............... | F16F 15/1204 464/109 |
| 8,726,753 B2 * | 5/2014 | Yang | ................... | F16H 55/16 74/409 |
| 8,915,162 B2 * | 12/2014 | Murphy | ................. | F16H 55/14 123/196 R |
| 2003/0145666 A1 | 8/2003 | Warner | | |
| 2004/0200302 A1 * | 10/2004 | Kampichler | ............ | F16H 55/18 74/409 |
| 2007/0012130 A1 | 1/2007 | Chevalier et al. | | |
| 2009/0217779 A1 | 9/2009 | Brosowske et al. | | |
| 2014/0041619 A1 * | 2/2014 | Yamauchi | ............ | B60K 7/0007 123/196 R |
| 2015/0053031 A1 * | 2/2015 | Willcox | ................... | F16H 1/20 74/409 |

OTHER PUBLICATIONS

Australian Patent Examination Report No. 1, Application No. AU 2013337884, dated Oct. 10, 2016.
European Extended Search Report, Application No. 13851296.7, dated May 6, 2016.

* cited by examiner

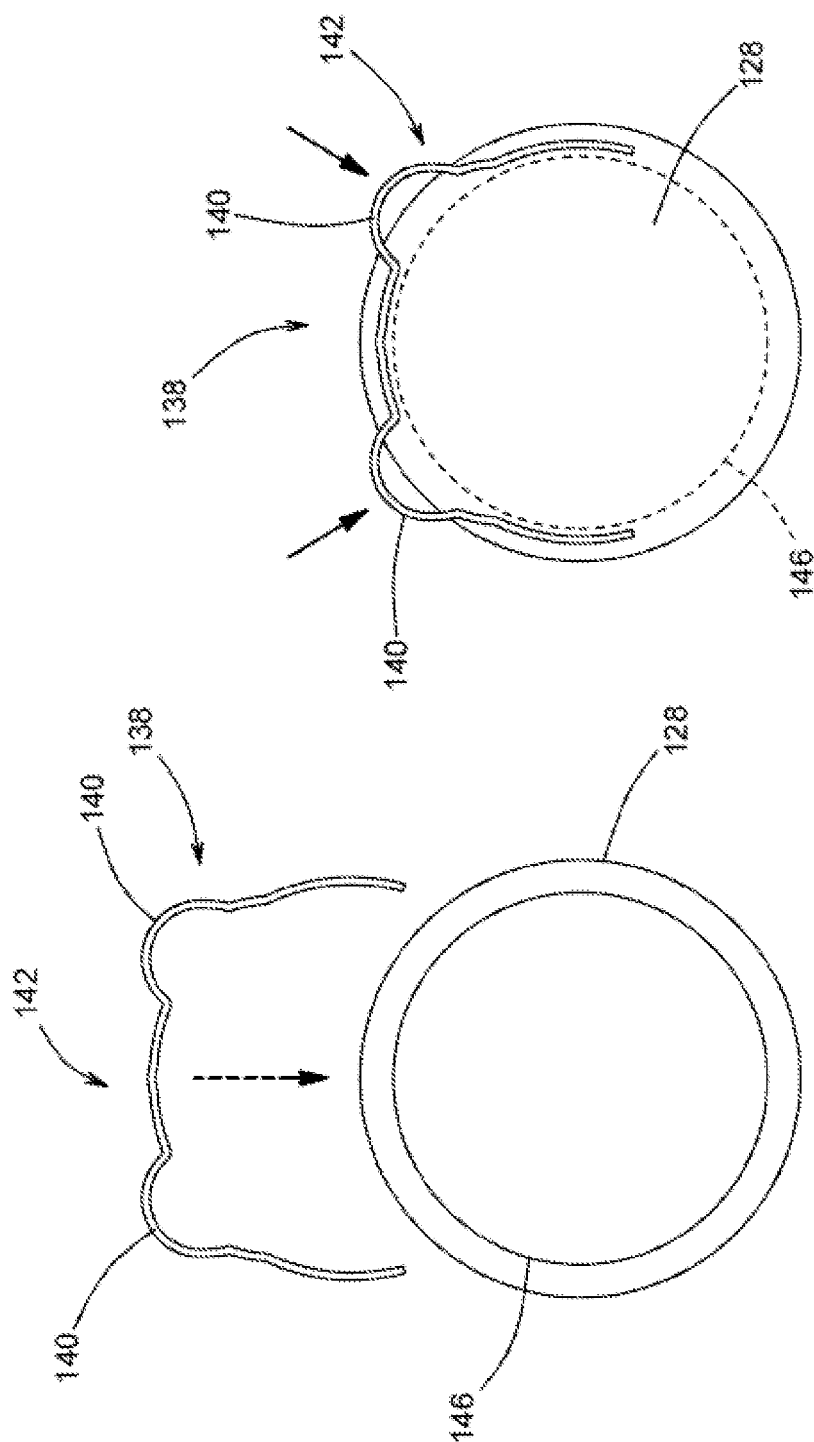

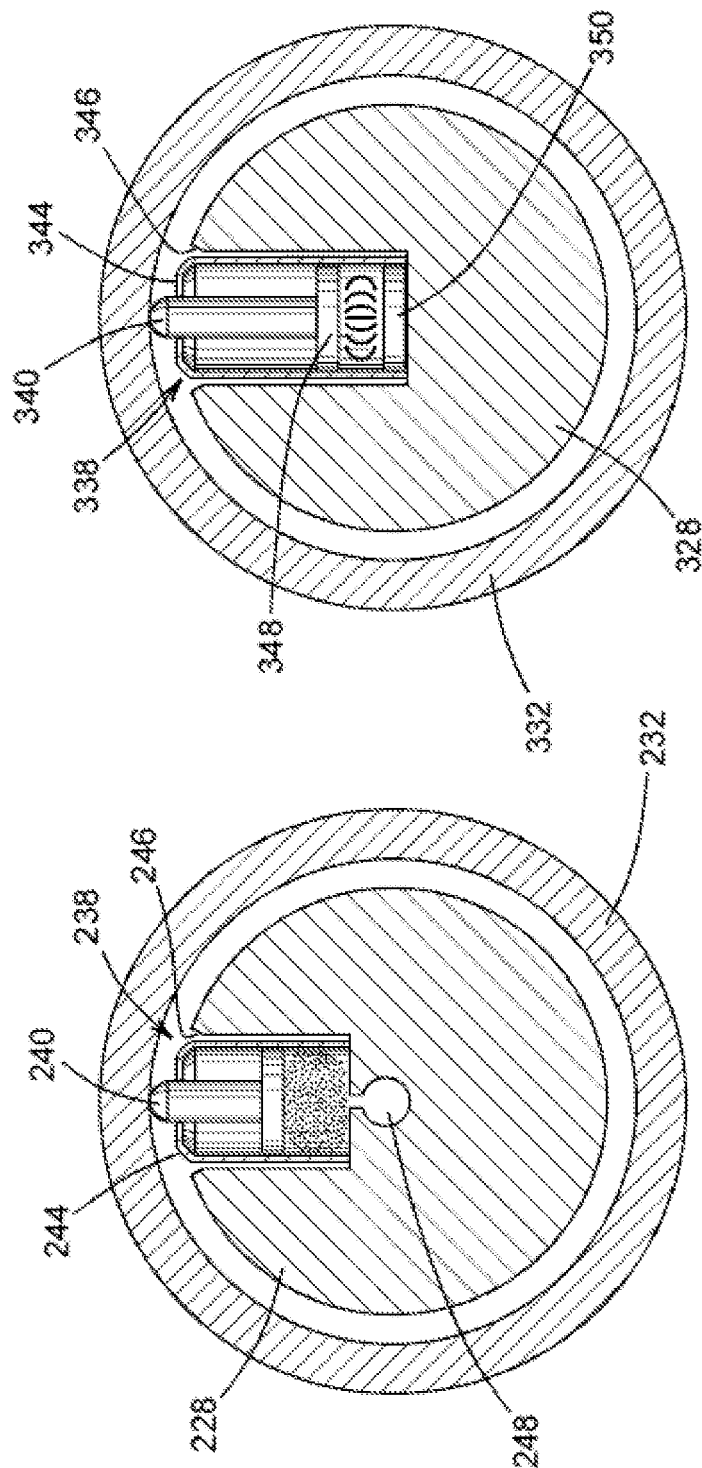

GEAR CONTROL SYSTEM FOR VIBRATION ATTENUATION

CROSS-REFERENCE TO RELATED APPLICATIONS

This application claims the benefit of U.S. Provisional Application No. 61/720,762, filed Oct. 31, 2012, the disclosure of which is incorporated herein by reference in its entirety.

BACKGROUND OF THE INVENTION

This invention relates in general to gear driven, power transfer assemblies. In particular, this invention relates to a control system for meshing gear elements that attenuates vibrational disturbances transmitted by contacting gear elements.

Gear trains are devices which transfer power from an input source to an output target by way of toothed elements. Power transfer relies on the intermeshing of a plurality of teeth disposed around the outer surface of mating gears. The intermeshing of gear teeth includes an amount of looseness to accommodate the tolerances associated with the plurality of teeth to prevent the teeth from binding or excessive wear. It is known that meshing teeth transfer vibrational disturbances generated by mating powertrain components during operation. These disturbances generally result in objectionable acoustical issues and can also generate structural excitations that cause damage by sympathetic vibration excitations.

It would be advantageous to provide a gear train that could compensate for vibrational issues that are transferred by gear mesh contact. It would further be advantageous to provide an adjustment mechanism that would be tunable to reduce or eliminate gear mesh vibrations.

SUMMARY OF THE INVENTION

This invention relates to a control system for attenuating gear vibrations. The control system includes a control module configured to displace a gear support shaft carrying a first gear. The first gear is intermeshed to a second gear and the displacement is such that looseness between the first and second gears is reduced.

This invention further relates to a power take off (PTO) unit having an input gear, an output gear connected to an output shaft, and an intermediary gear supported for rotation on an idler shaft. The intermediary gear is connected to the input gear and the output gear for rotational power transfer. A housing supports the idler shaft and the output shaft. A control module acts between the housing and the idler shaft to displace the intermediary gear toward at least one of the input gear and the output gear. The displacement is such that looseness between the intermediary gear and the at least one of the input gear and the output gear is reduced.

The invention further relates to an intermeshed gear set configured to transfer power from an input gear to an output gear. The intermeshed gear set has an intermediary gear supported for rotation on a shaft. The intermediary gear is in meshed engagement with the input gear and the output gear. A control module acts against the shaft such that the intermeshing of the intermediary gear with one of the input gear and the output gear reduces a gear rattle vibration.

Various aspects of this invention will become apparent to those skilled in the art from the following detailed description of the preferred embodiments, when read in light of the accompanying drawings.

BRIEF DESCRIPTION OF THE DRAWINGS

FIG. 5A is an enlarged exploded view of a second embodiment of a control module and a support shaft for a meshing gear train system.

FIG. 5B is an assembled view of the control module and the support shaft of FIG. 5A.

FIG. 6 is an enlarged schematic view of a third embodiment of a control module and a support shaft for a meshing gear train system.

FIG. 7 is an enlarged schematic view of a fourth embodiment of a control module and a support shaft for a meshing gear train system.

DETAILED DESCRIPTION OF THE PREFERRED EMBODIMENT

Figure 1:
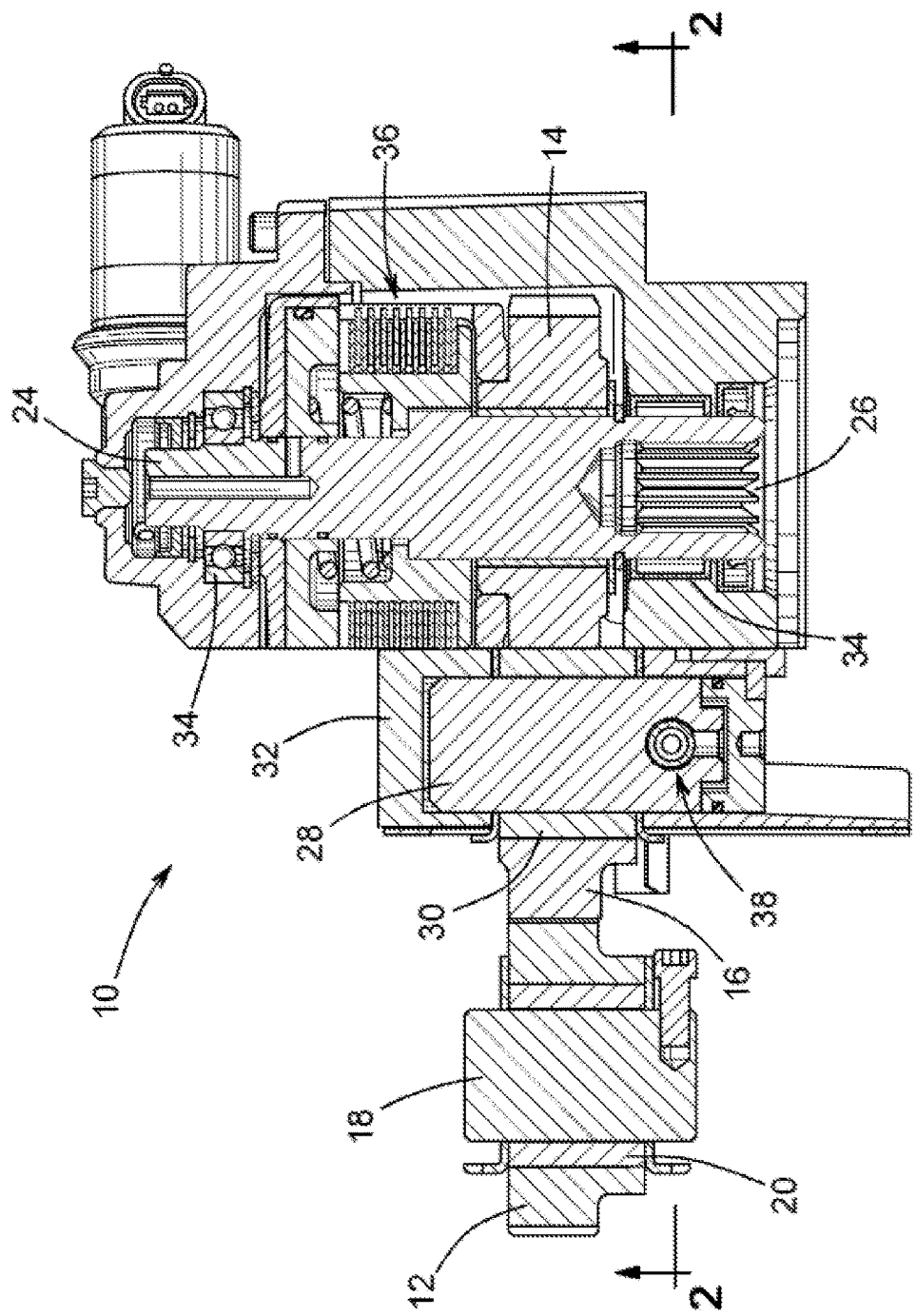
FIG. 1 is a cross sectional view of a meshing gear train system, embodied in a power take-off (PTO) unit, having a control module in accordance with the invention.

Referring now to the drawings, there is illustrated in FIG. 1 a meshing gear train system, embodied as a power take-off (PTO) unit, shown generally at 10. Though shown and described in the context of a PTO unit, the various embodiments of the invention described below are suitable for any rotating gear train system. The PTO unit 10 is configured to accept power input from a primary drive component, such as an engine or a transmission, and produce an output sufficient to drive an auxiliary device, such as a hydraulic pump or electric generator. In the illustrated embodiment, the PTO unit 10 includes an input gear 12, an output gear 14, and an intermediary gear 16. The gears 12, 14, and 16 are arranged such that the teeth are in a meshing engagement to transfer rotary motion and power from the input gear 12 to the output gear 16. It should be understood that the gears may be provided in any number and in any mounting arrangement other than depicted and remain within the scope of the invention. In the illustrated embodiment, the input gear 12 is mounted on an input support shaft 18 for relative rotation thereto. A friction reducing element 20, such as a bearing assembly, may be interposed between the input gear and the input support shaft 18. The input support shaft 18 may be fixed relative to a first housing 22, as shown in FIG. 2, or may be permitted to rotate relative to the first housing 22.

The first housing 22 may be attached to or be a part of the primary drive component, such as an engine, transmission, or other vehicle powertrain component. The output gear 16 is coupled to an output shaft 24 such that rotation of the output gear 16 causes rotation of the output shaft 24. The output shaft 24 includes a coupling interface 26, illustrated as a female splined bore, that is configured to accept a mating component or driveshaft arrangement. The coupling interface 26 may be any structure, such as a flange, universal joint yoke, secondary gear train, and the like that transfers the motion of the output shaft to an input of the driven auxiliary device.

The intermediary gear 16 transfers motion from the input gear 12 to the output gear 14. The intermediary gear 16 is mounted on a gear support shaft, such as an idler shaft 28, and may include a friction reducing element 30, such as a bearing assembly, disposed between intermediary gear 16 and the idler shaft 28. In the illustrated embodiment, the idler shaft 28 is mounted in a fixed orientation to a second housing 32. The second housing 32 is connected to the first housing 22. The output shaft 24 is mounted for concurrent rotation with the output gear 14 and rotates relative to the second housing 32. As shown in FIG. 1, bearing elements 34 may be disposed between the output shaft 24 and the second housing 32. A clutch assembly, shown generally at 36, may be provided to selectively engage and disengage the connection between the output gear 14 and the output shaft 24.

Figure 2:
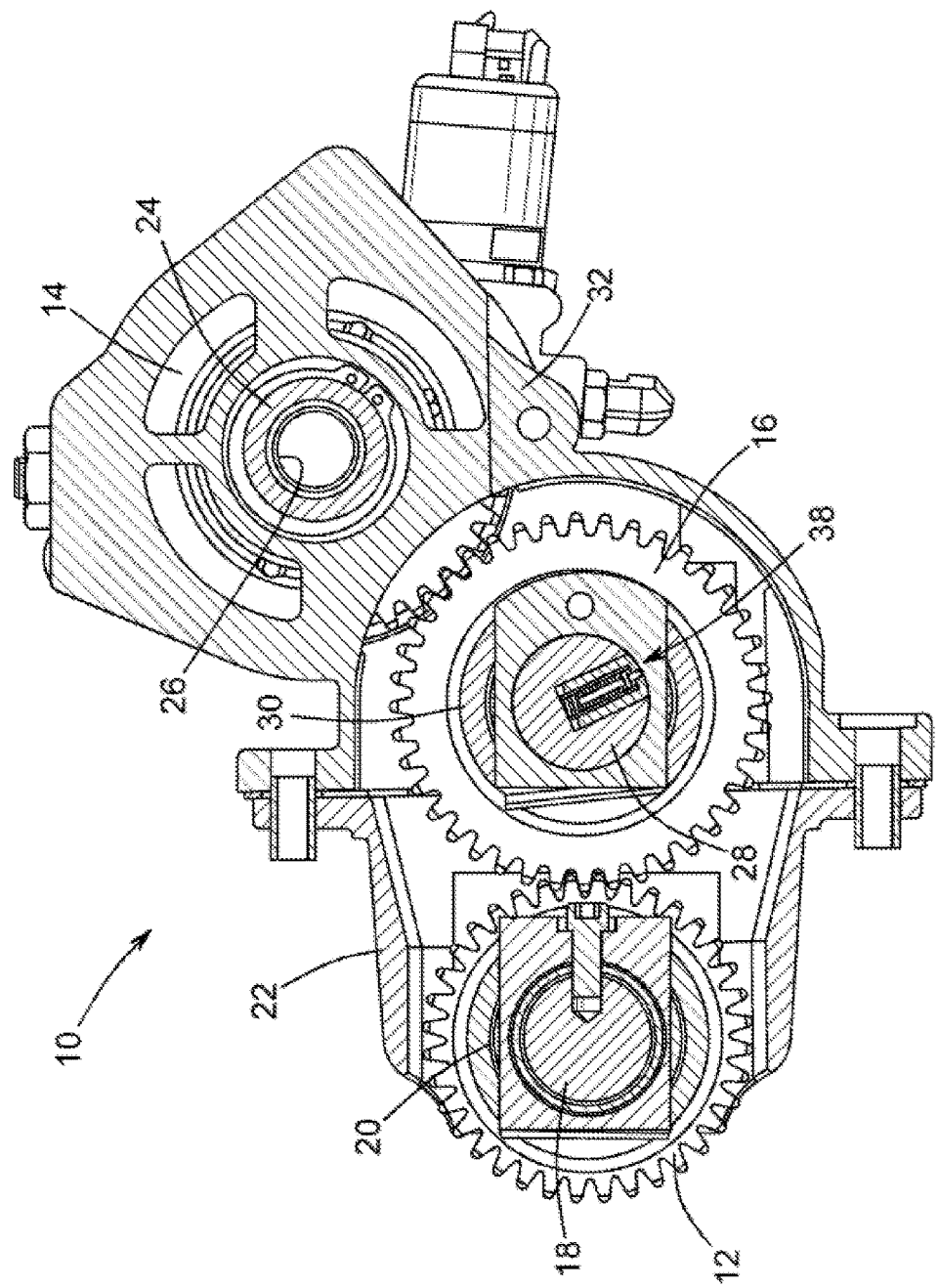
FIG. 2 is another cross-sectional view of the PTO unit of FIG. 1, taken along line 2-2.
Figure 3:
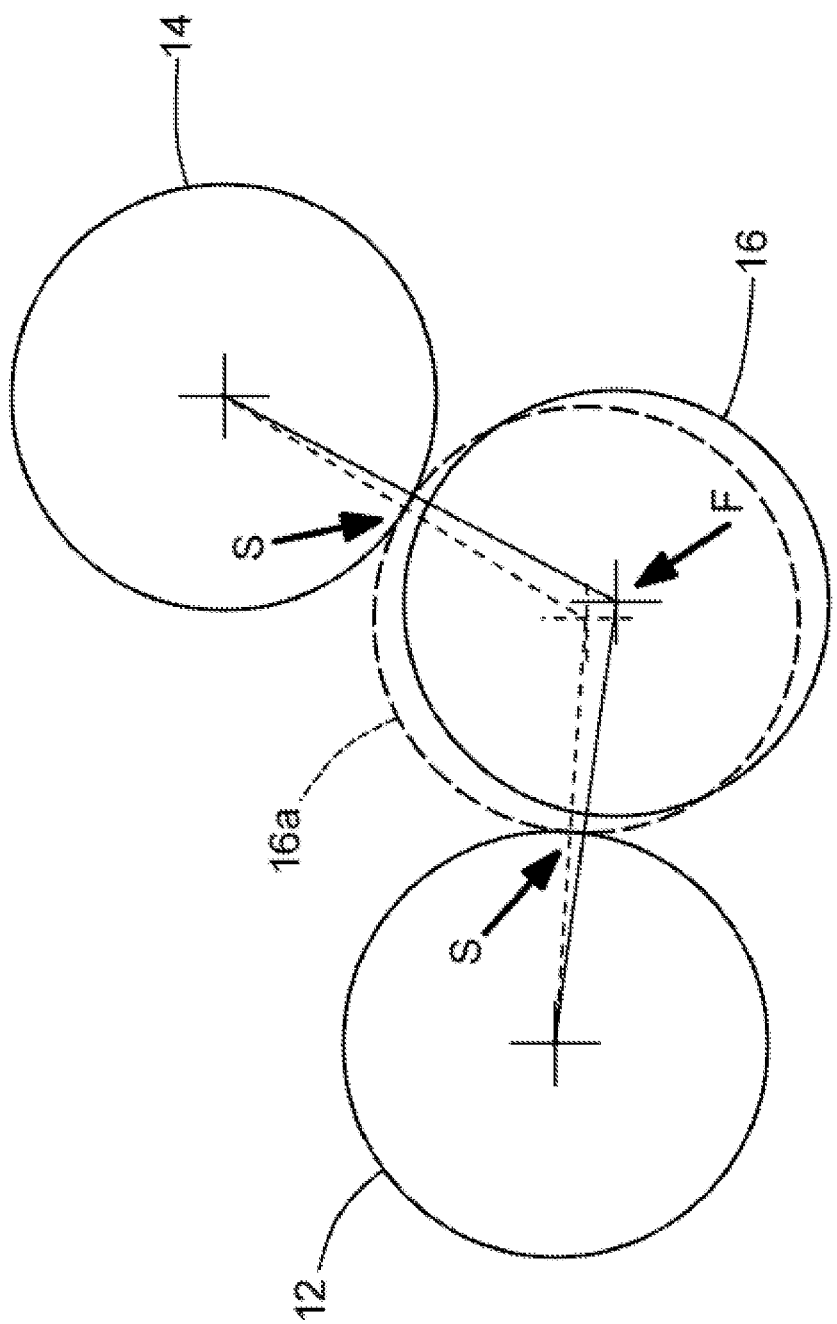
FIG. 3 is a schematic illustration of the meshing gears of FIG. 2 showing the application of a control module biasing force and the resulting deflection of the gears.

Referring now to FIG. 3, the gear train of FIG. 2 is illustrated schematically to show the general movement of the intermediary gear 16 relative to the input and output gears 12 and 14, respectively. The rotational centerlines of input gear 12 and output gear 14 are generally considered to be fixed relative to the first and second housings 22 and 32. The centerline of intermediary gear 16, and thus the entire gear 16, is permitted to move to a secondary or biased position 16a in response to a biasing force, F, exerted by a control module, shown generally at 38 in FIG. 2. The control module 36 is illustrated as being mounted to the idler shaft 28, though other mounting arrangements are considered within the scope of the invention, as will be described below. Furthermore, more than one control module 38, or any of the control modules described herein, may be used to attenuate vibrational disturbances, such as gear rattle. In the illustrated embodiment of FIG. 3, the intermediary gear 16 is illustrated in a generally unloaded or lightly loaded operating condition. In this condition, the input, output, and intermediary gears 12, 14, and 16 are driven by the primary drive component which can input a vibrational disturbance, such as a harmonic torsional oscillation, that manifests itself as objectionable gear rattle or other audible or tactile vibration excitation. A gear rattle noise may be transmitted and/or amplified by the gear teeth moving through the looseness associated with manufacturing and mounting tolerances. This movement may be caused by engine firing pulses, for example, that are transmitted through the gear train and cause movement of the meshed teeth within the spaces therebetween. In addition, other ancillary sources of noise may be caused by gear tooth profiles, surface finish conditions, and other mounting tolerances, for example.

The control module 38 applies a controlled biasing force F to move the intermediary gear 16 into a more engaged mesh condition with the input and output gears 12 and 14 during the unloaded or lightly loaded operating conditions. The more engaged condition is illustrated in FIG. 3 where the intermediary gear 16 will be moved to a deflected position 16a (shown in dashed lines) by the biasing force F generated by the control module 38. When subjected to operating loads, gear separation forces S tend to oppose the biasing force F and move the intermediary gear 16 back toward the undeflected position (shown in solid lines). The biasing force F tends to oppose the resultant force of the gear separation forces acting at the intermediary gear centerline such that the gear mesh of the input gear 12, output gear 14, and intermediary gear 16 is improved and gear rattle is reduced or eliminated.

Figure 4:
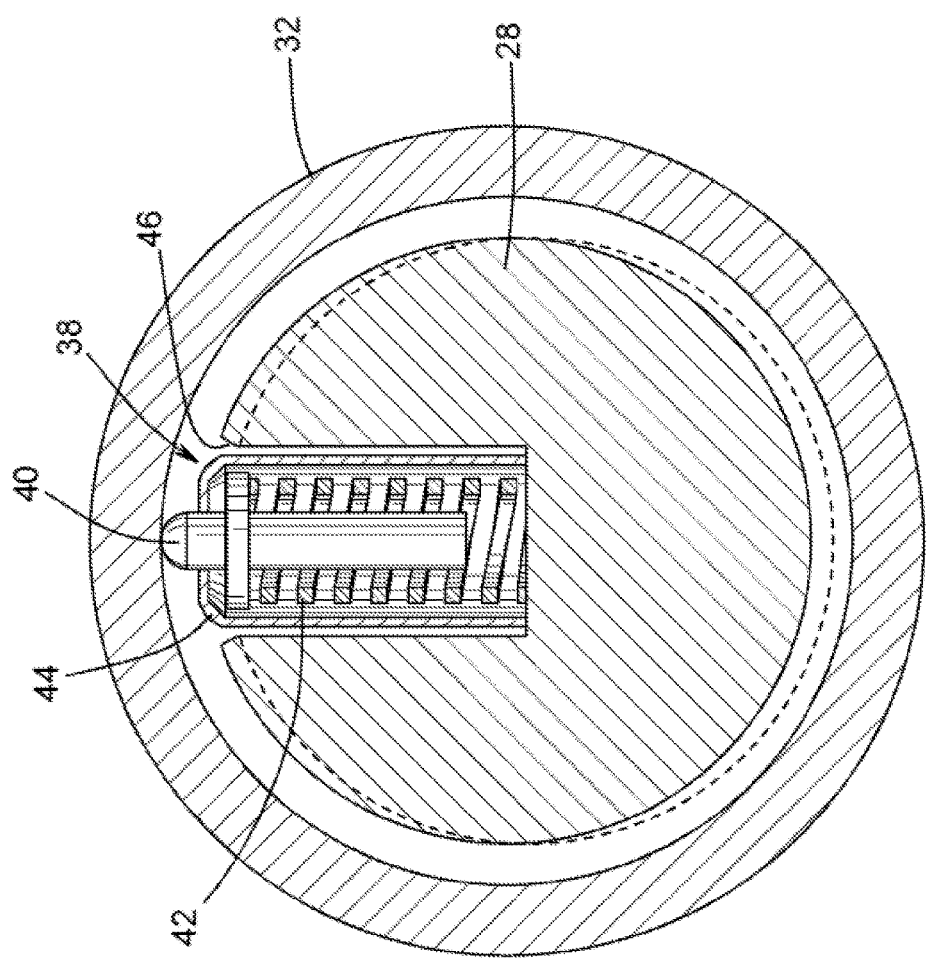
FIG. 4 is an enlarged schematic view of the embodiment of the control module of FIG. 2.

Referring now to FIG. 4, there is illustrated an enlarged view of the control module 38 mounted in the idler shaft 28. The control module 38 includes a plunger pin 40 that is biased in a radially outward direction by a spring 42. The plunger pin 40 and spring 42 may be contained in a module housing 44, if so desired. The spring 42 is illustrated as a coil spring that is disposed about the plunger pin 40. Alternatively, the spring 42 may be any resilient member that is configured to apply a radial biasing force, such as a Belleville washer, volute spring, or an elastomeric (rubber, polymer, etc.) member. The spring 42 may be disposed anywhere relative to the plunger pin 40 (i.e., outside or inside of a stem portion of the plunger pin 40) such that the resultant biasing force acts to radially shift the idler shaft 28 in the desired direction, such as toward the input and output gear centerlines. In the illustrated embodiment, the idler shaft 28 includes a bore 46 that accepts the control module 38. The bore 46 and the control module 38 are shown in FIG. 4 in an orientation such that the idler shaft 28 and the intermediary gear 16 are deflected toward a line that connects the centerlines of the input and output gears 12 and 14. This orientation is an example of aligning the control module 38, and particularly the plunger pin 40, to generate a biasing force F that causes deflection of the idler shaft 28 to improve gear mesh engagement in the unloaded or lightly loaded PTO drive conditions. The biasing force is preferably large enough to create a greater contact of the gear teeth of the intermeshed gears, particularly in the unloaded or lightly torsional loaded condition. The biasing force F should also permit the gear separation forces to oppose the deflected position of the intermediary gear 16, relative to the input and output gears 12, 14, so that the gear spacing is returned toward the design or undeflected position under heavier or larger load conditions. The resulting condition of the idler shaft 28 and intermediary gear 16 is that they are permitted to float or move relative to the input and output gears 12 and 14.

Referring now to FIGS. 5A and 5B, there is illustrated a second embodiment of a control module, shown generally at 138, that cooperates with an idler shaft 128. The control module 138 includes a spring 142 having a pair of contact points 140 that contact the second housing 32, similar to contact of the plunger pin 40. Though shown as two contact points 140, one or more contact points may be provided. The contact points 140 are oriented and positioned, relative to the input and output gears 12 and 14, so that the tooth mesh of the input and output gears 12 and 14 to the intermediary gear 16 is improved to reduce or eliminate the gear rattle condition, particularly in the unloaded or lightly loaded conditions. The idler shaft 128 includes a mounting groove 146 that is configured to accept the control module 138. The groove 146 is illustrated as a turned diameter, having a generally round diameter at the base of the groove 146. The orientation of the control module 138 and the contact points 140 may be rotated on the idler shaft 128 to adjust or otherwise fine tune the magnitude and orientation of the resultant forces relative to the gear rattle condition. Alternatively, the control module 138 and the mounting groove 146 may also have cooperating positive orientation features, such as flat sections (not shown), to provide a fixed orientation relative to the input and output gears 12 and 14. The spring rate of the control module 138 is sufficient to permit the intermediary gear 16 to float relative to the input and output gears 12 and 14.

Referring now to FIG. 6, there is illustrated a third embodiment of a control module, shown generally at 238. The control module 238 includes a plunger pin 240 that is disposed in a module housing 244. In the illustrated embodiment, the control module 238 is disposed in a bore 246 formed in an idler shaft 228. The plunger pin 240 seals against the inner surface of the module housing 244 so that a source of pressurized fluid, such as automatic transmission fluid, can be supplied to generate the biasing force F. The idler shaft 228 also includes a fluid port 248 that delivers fluid to the control module 238 to radially load the plunger pin 240 against a second housing 232. The fluid pressure may be held at a fixed pressure or modulated to vary the pressure during operation of the PTO unit. Modulating the fluid pressure also modulates the biasing force to adjust the force dampening influence of the control module on attenuation of gear rattle. When the fluid pressure is modulated in response to the torque loading of the gears, a feedback loop may be provided. The feedback loop may include one or more sensors, such as a torque sensor, fluid pressure sensor, accelerometer, microphone, or speed sensor, to measure the various influencing factors relative to gear rattle. The torque sensor provides an indication of the load on the gear train in order to adjust the biasing force in response to the gear separation forces and gear rattle signal. The fluid pressure sensor determines the fluid pressure state and an indication of a decrease or increase in fluid pressure. The accelerometer (or microphone or speed sensor) measures a vibrational signal associated with and proportional to the gear rattle phenomenon. A control algorithm may vary the fluid pressure in response to torque loads and/or vibration levels to adjust the biasing force and minimize the gear rattle vibration signature. A return spring (not shown) may be disposed between the plunger pin 240 and the module housing 244 to retract the plunger pin 240 away from the second housing 232, if desired.

Referring now to FIG. 7, there is illustrated a fourth embodiment of a control module, shown generally at 338. The control module 338 is similar to the hydraulically actuated control module 238, but instead uses a varying magnetic field to provide the biasing force F rather than fluid pressure. The control module 338 includes a plunger pin 340 disposed in a module housing 344, which is inserted in a bore 346 formed in an idler shaft 328. The plunger pin 340 includes a first magnet 348 that may be a permanent magnet. The control module 338 also includes a second magnet 350, disposed at the base of the module housing 344, that is an electromagnet. When energized, the second magnet 350 is connected to be the same magnetic pole as the first magnet 348. Thus, the first magnet 348 is repelled away from the second magnet 350 and radially extends the plunger pin 340 to generate the biasing force F against a second housing 332. The power supplied to the electromagnet 350 can be varied in order to vary the biasing force F. In addition, sensors similar or analogous to those described above can be used to modulate the biasing force F to provide adjustability to the control system to attenuate gear rattle at various load and operating conditions.

Figure 8:
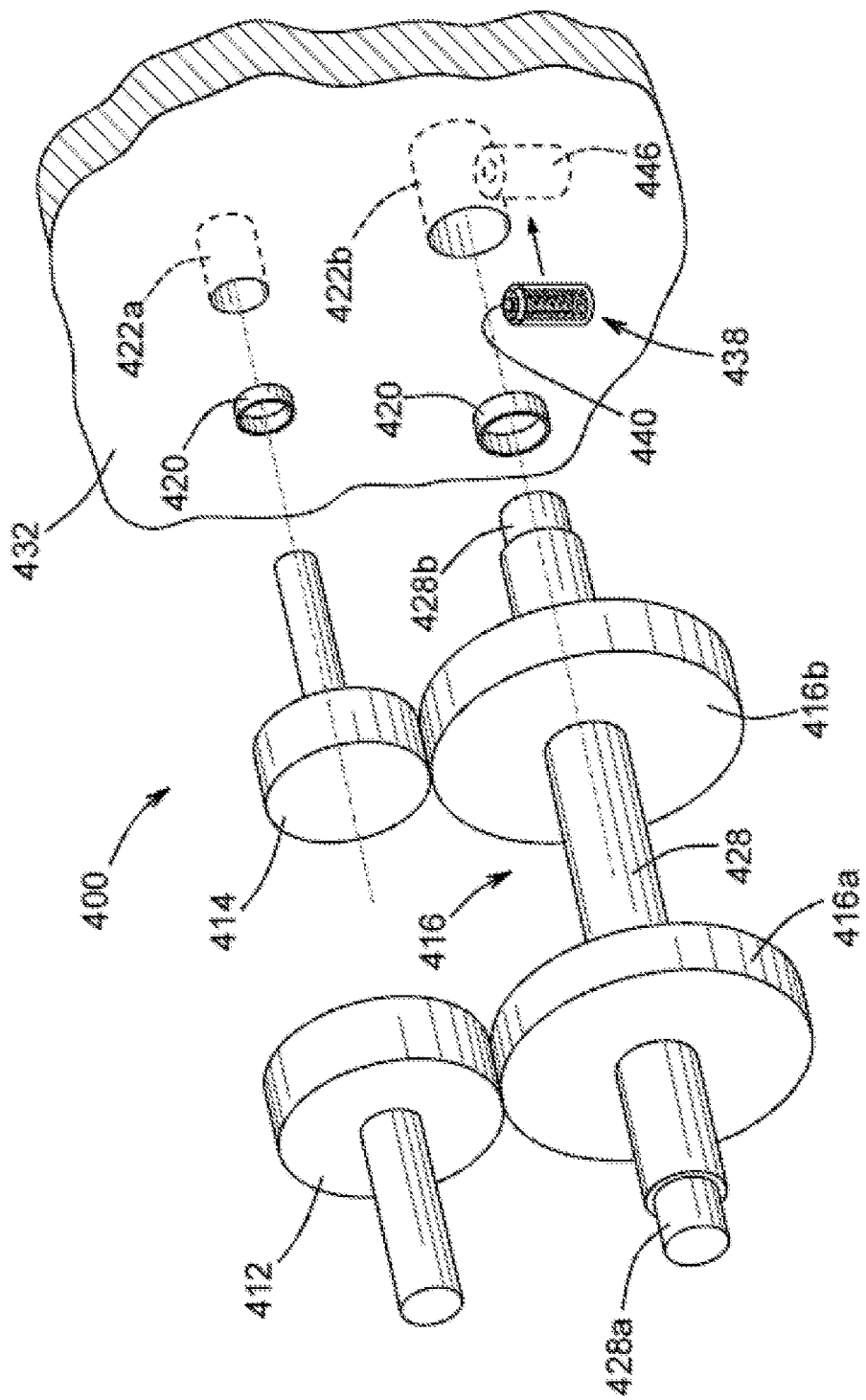
FIG. 8 is an enlarged exploded, perspective view of a meshing gear train system and housing having a fifth embodiment of a control module and mounting arrangement.

Referring now to FIG. 8, there is illustrated a fifth embodiment of a gear train system, shown generally at 400, which may also be embodied as a PTO unit, though such is not required. The gear train system 400 includes a first gear or input gear 412, a second gear or output gear 414, and an intermediary gear set, shown generally at 416. The intermediary gear set 416 may include a first intermediary gear 416a and a second intermediary gear 416b, as illustrated. Alternatively, the intermediary gear set 416 may be a single intermediary gear as described above in conjunction with the other embodiments described herein. Alternatively, the intermediary gear set 416 may have more than two gears. The gears 412, 414, and 416 are supported for rotation relative to a housing 432, which may be similar to the second housing 32 described above. In the illustrated embodiment, the intermediary gear set 416, or one or more intermediary gears 416a or 416b, includes an idler shaft 428, having end supports 428a and 428b. The idler shaft 428 is configured to rotate relative to the housing 432. Friction reducing elements 420, such as bearings or bushings, may be coupled to the end supports 428a, 4286b and disposed within support bores 422a and 422b in the housing 432. Support bore 422a is a generally round bore configured to support one of the input and output gears 412, 414 for rotation and maintain a fixed lateral position of the gear relative to the housing 432. The support bore 422b is configured to support the idler shaft 428 for rotation and permit lateral adjustment of the idler shaft end supports, for example end support 428b, relative to the housing 432. A module bore 446 intersects the support bore 422b that supports the idler shaft 428.

A control module, shown generally at 438, is disposed within the module bore 446. The control module 438 may be configured as any of the control modules described above. The control module 438 includes a plunger pin 440 that contacts the friction reducing element 420 and, in some embodiments, may be fixed to the outer surface thereof. The control module 438 operates similarly to the various embodiments of control modules described above in order to attenuate gear rattle, or other gear mesh vibrational disturbances, by positioning the biasing force F to generally provide a load to the meshed gears, particularly during unloaded or lightly loaded operation.

Figure 9:
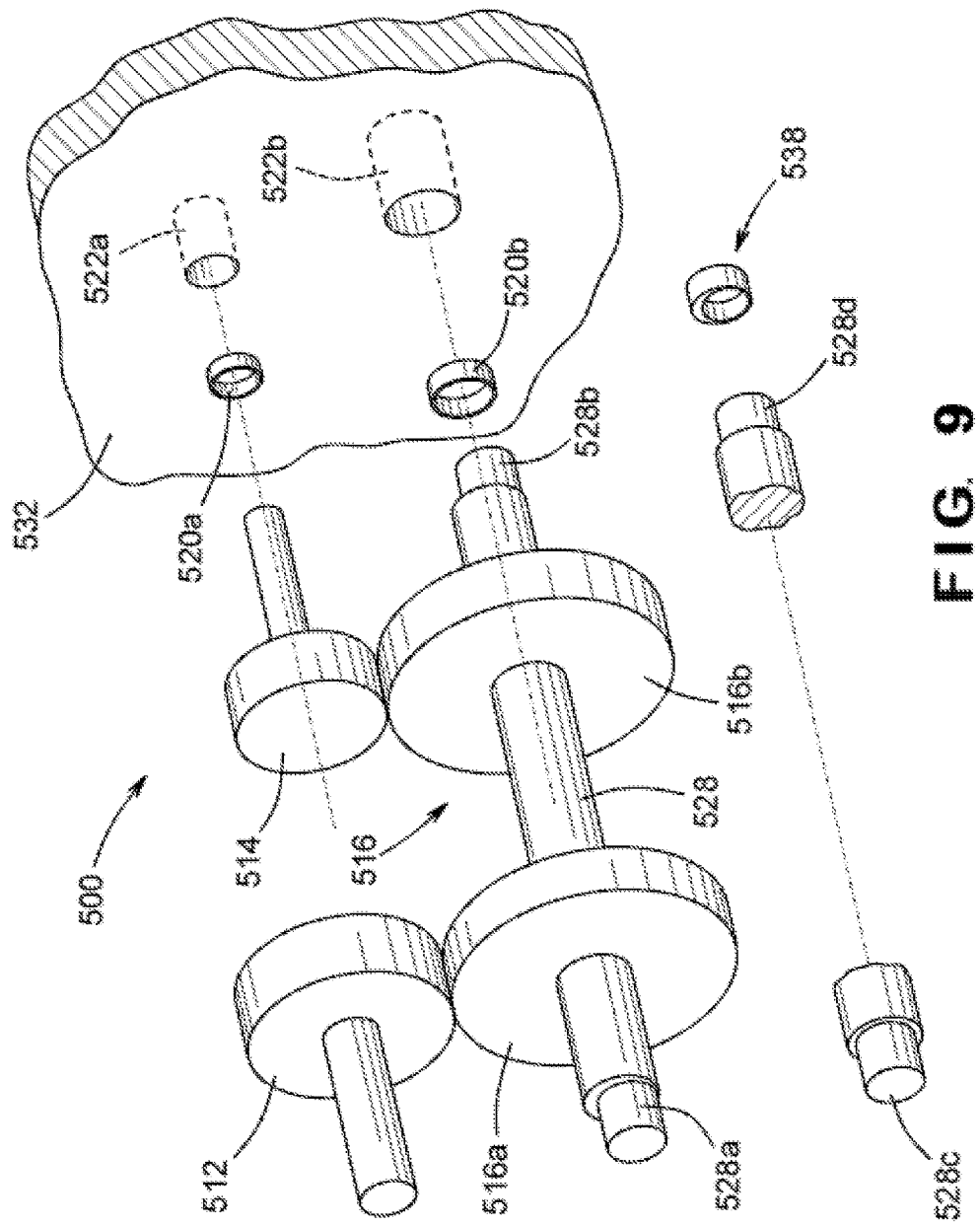
FIG. 9 is an enlarged exploded, perspective view of a meshing gear train system and housing having sixth and seventh embodiments of a control module and mounting arrangement.
Figure 10:
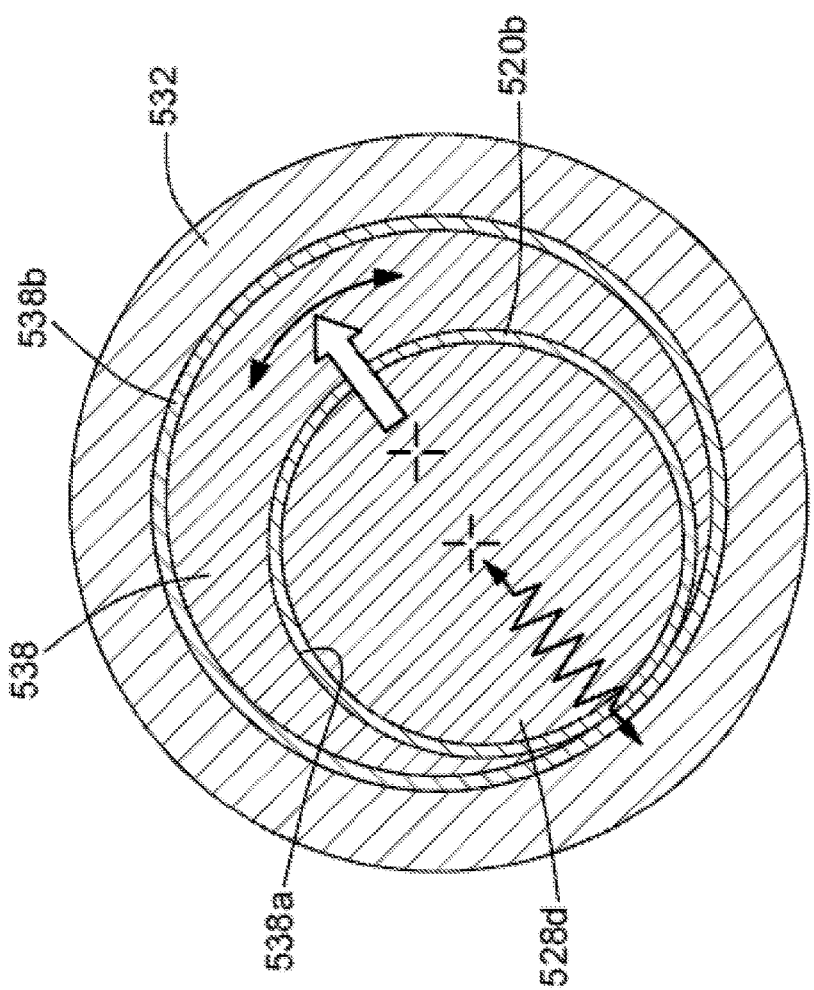
FIG. 10 is a cross sectional schematic view of the seventh embodiment of the control module and mounting arrangement of FIG. 9.

Referring now to FIGS. 9 and 10, there are illustrated sixth and seventh embodiments of a gear train system, shown generally at 500 which may also be embodied as a PTO unit, though such is not required. The gear train system 500 includes a first gear or input gear 512, a second gear or output gear 514, and an intermediary gear set, shown generally at 516. The intermediary gear set 516 may include a first intermediary gear 516a and a second intermediary gear 516b, as illustrated. Alternatively, the intermediary gear set 516 may be a single intermediary gear, as described above in conjunction with the other embodiments described herein. Alternatively, the intermediary gear set 516 may have more than two gears. The input and output gears 512 and 514 are supported for rotation relative to a housing 532, which may be similar to the second housing 32 described above. The input and output gears 512 and 514 may be supported for rotation by the housing 532, such as through a bearing element 520a disposed in a support bore 522a. Alternatively, the input gear 512 may be supported for rotation on a shaft, similar to the embodiment described in FIGS. 1 and 2, above.

In the sixth embodiment, the intermediary gear set 516, or one or more intermediary gears 516a or 516b, includes an idler shaft 528, having end supports 528a and 528b. The support ends 528a and 528b may be supported within bushings, such as an optional bushing 520b, disposed in a support bore 522b. Support bore 522b and bushing 520b may be larger in size than support bore 522a and bushing 520a, though such is not required. The idler shaft 528 is configured to be rotationally adjustable relative to the housing, but remain in a generally fixed orientation during operation of the PTO unit 500. Thus, the intermediary gears 516a and 516b are configured to rotate relative to the idler shaft 528 in a manner similar to the embodiments described in conjunction with FIGS. 1-7. The support ends 528a and 528b are configured as eccentric support ends and function as control modules, similar to control module 538 which will be described below in detail, that are integrated into the idler shaft 528 to provide the biasing force F to counteract gear rattle or other gear mesh based vibrational conditions during various operating conditions. The eccentricity of the support ends 528a and 528b are oriented toward the input and output gears 512 and 514 in order to direct the biasing force F to increase the gear mesh interfaces to attenuate gear rattle.

The idler shaft 528 may be rotated clockwise or counterclockwise within the support bore 522b, relative to the housing 532, to move the idler shaft 528 and the intermediary gears 516 toward or away from the input and output gears 512 and 514. This biasing force adjustment may be made once before operation or may be done dynamically during operation by way of a rotational positioning device, such as a stepper motor or other actuation devices that can move to a desired position and fix the shaft in that desired position. Additionally, any feedback loop, such as those described above may be used to adjust the biasing force F to minimize gear vibration and compensate for gear separation forces.

In the seventh embodiment, the idler shaft 528 may configured to rotate during operation relative to the housing 532. In this variation, the idler shaft 528 and the intermediary gears 516a and 516b rotate together, and the idler shaft 528 includes end supports 528c and 528d. The end supports 528c and 528d have diameters that are concentric with the centerline of the idler shaft 528. The friction reducing elements 520a and 520b, such as bearings or bushings, are coupled to the end supports 528c, 528d and disposed within a control bore 538a of a control module 538, as shown in FIG. 10. The outer surface of the control module 538 may be disposed directly into the support bores 522a and 522b of the housing 532 or may be disposed within bushings 538b to aid in rotational adjustment relative to the housing 532. Adjustment of the biasing force F may be accomplished by rotation of the control module 538 relative to the housing 532, similar to that described above.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A control system for attenuating gear vibrations, the control system comprising:
   a control module configured to displace a gear support shaft carrying a first gear that is intermeshed to a second gear such that looseness between the first and second gears is reduced, wherein:
   the control module includes a plunger pin that contacts the gear support shaft and generates a biasing force that displaces the first gear relative to the second gear; and
   the control module includes a permanent magnetic and an electromagnet that cooperate to generate a magnetic field that displaces the plunger pin.

2. The control system of claim 1 wherein the plunger pin generates a radial biasing force that displaces the first gear relative to the second gear.

3. The control system of claim 2 wherein the control module includes a module housing that contains the plunger, the module housing disposed in a bore, the bore being oriented such that the radial biasing force is directed to move the first gear toward a plane that includes a centerline of the second gear and a centerline of a third gear.

4. The control system of claim 1 wherein the control module generates a radial biasing force that displaces the gear support shaft such that the first gear is displaced toward the second gear.

5. A power take off (PTO) unit comprising:
   a housing adapted to be attached to a primary drive component;
   an input gear rotatably supported on the housing and including a portion that extends from the housing and is adapted to be rotatably driven by the primary drive component;
   an output gear connected to an output shaft supported on the housing;
   an intermediary gear supported for rotation on an idler shaft supported on the housing, the intermediary gear connected to the input gear and the output gear for rotational power transfer; and
   a control module acting between the housing and the idler shaft, the control module configured to displace the intermediary gear toward at least one of the input gear and the output gear such that looseness between the intermediary gear and the at least one of the input gear and the output gear is reduced, wherein
   the control module is mounted on the idler shaft and includes a spring, the control module having at least one contact point that acts against the housing,
   the at least one contact point is part of a plunger pin, the control module configured to radially displace the plunger pin against the housing to create a biasing force that displaces the idler shaft toward the at least one of the input gear and the output gear, and
   the control module is mounted in a hole formed in the idler shaft.

6. The PTO unit of claim 5 wherein the control module is mounted within the housing, the control module including a contact point that acts against the idler shaft to create a biasing force that displaces the idler shaft toward the at least one of the input gear and the output gear.

7. An intermeshed gear set configured to transfer power from an input gear to an output gear, the intermeshed gear set having an intermediary gear supported for rotation on a shaft, the intermediary gear being in meshed engagement with the input gear and the output gear, and a control module acting against the shaft such that the meshed engagement of the intermediary gear with one of the input gear and the output gear reduces a gear rattle vibration, wherein either:
   the control module is mounted in the shaft and acts against a housing that supports at least one of the input gear, the output gear and the intermediary gear for rotation, the control module having a plunger pin that is biased to generate a biasing force that reduces the gear rattle vibration; or
   the control module is in communication with a feedback loop having a sensor configured to monitor at least one parameter of a gear set operational characteristic, the feedback loop controlling a biasing force generated by the control module.

8. The intermeshed gear set of claim 7 wherein the control module is mounted in the shaft and acts against a housing that supports at least one of the input gear, the output gear and the intermediary gear for rotation, the control module having a plunger pin that is radially biased by a spring to generate a biasing force that reduces the gear rattle vibration.

9. The intermeshed gear set of claim 7 wherein the control module is mounted in a housing that supports the intermediary gear for rotation, the control module including a plunger pin that is radially biased by a pressurized fluid, the pressurized fluid being adjustable to vary the biasing force.

10. The intermeshed gear set of claim 7 wherein the control module is in communication with a feedback loop having a sensor configured to monitor at least one parameter of a gear set operational characteristic, the feedback loop controlling a biasing force generated by the control module.

11. A power take off (PTO) unit comprising:
a housing adapted to be attached to a primary drive component;
an input gear rotatably supported on the housing and including a portion that extends from the housing and is adapted to be rotatably driven by the primary drive component;
an output gear connected to an output shaft supported on the housing;
an intermediary gear supported for rotation on an idler shaft supported on the housing, the intermediary gear connected to the input gear and the output gear for rotational power transfer; and
a control module acting between the housing and the idler shaft, the control module configured to displace the intermediary gear toward at least one of the input gear and the output gear such that looseness between the intermediary gear and the at least one of the input gear and the output gear is reduced, wherein
the control module is mounted on the idler shaft and includes a spring, the control module having at least one contact point that acts against the housing, and the spring is mounted on a groove formed into the idler shaft.

12. A power take off (PTO) unit comprising:
a housing adapted to be attached to a primary drive component;
an input gear rotatably supported on the housing and including a portion that extends from the housing and is adapted to be rotatably driven by the primary drive component;
an output gear connected to an output shaft supported on the housing;
an intermediary gear supported for rotation on an idler shaft supported on the housing, the intermediary gear connected to the input gear and the output gear for rotational power transfer; and
a control module acting between the housing and the idler shaft, the control module configured to displace the intermediary gear toward at least one of the input gear and the output gear such that looseness between the intermediary gear and the at least one of the input gear and the output gear is reduced, wherein
the control module is mounted on the idler shaft and includes a plunger pin having at least one contact point that acts against the housing, the control module radially displacing the plunger pin against the housing to create a biasing force that displaces the idler shaft toward the at least one of the input gear and the output gear.

13. The PTO unit of claim 12 wherein the control module includes a spring that displaces the plunger pin.

14. The PTO unit of claim 12 wherein the plunger pin is displaced by a fluid within the control module to generate a biasing force, a pressure of the fluid being adjustable to control a magnitude of the biasing force.

* * * * *